T. Grimsley,
Riding Saddle,
Nº 5,396.            Patented Dec. 11, 1847.
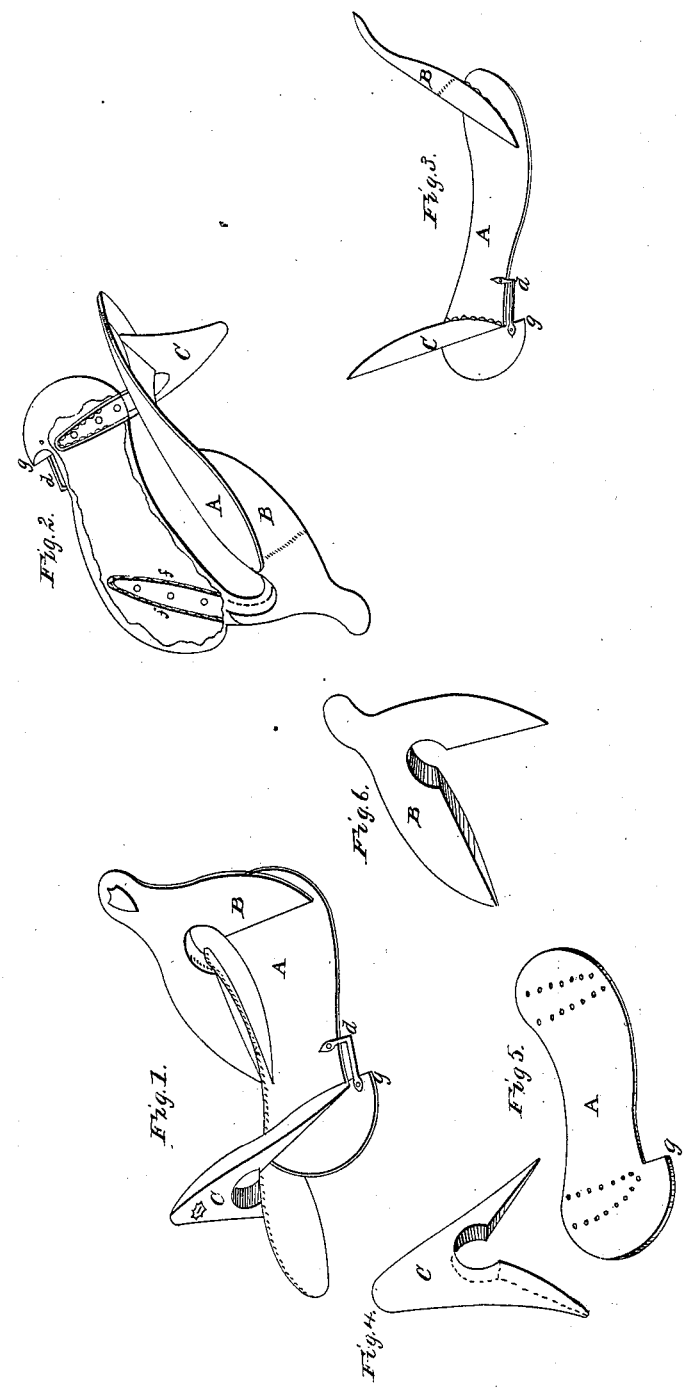

UNITED STATES PATENT OFFICE.

THORNTON GRIMSLEY, OF ST. LOUIS, MISSOURI.

DRAGOON-SADDLETREE.

Specification of Letters Patent No. 5,396, dated December 11, 1847.

*To all whom it may concern:*

Be it known that I, THORNTON GRIMSLEY, of the city of St. Louis and State of Missouri, have invented a new and improved Saddletree Possessing Qualities That Particularly Adapt it to the Formation of Dragoon and other Military Saddles; and I do hereby declare the following to be a full, clear, and exact description thereof, reference being had to the accompanying drawings, making a part of this specification.

Figure 1, is a perspective view of my military saddle tree, standing in its natural position; Fig. 2, a perspective view of the same reversed; Fig. 3, a side elevation thereof, and Figs. 4, 5, and 6, represent the pommel, one of the side bars, and the cantle of the tree, detached.

Similar letters indicate like parts in all the figures.

A, A, are the side bars, B, is the cantle, and C, is the pommel of the tree.

The nature of my invention consists of an improvement upon the form of the pommel and cantle made use of in the construction of the French hussar (or old dragoon regulation) saddle tree, and in the combination—without metallic fastenings—of the French hussar or dragoon regulation style of pommel and cantle, or my improved form of pommel and cantle with winding side bars; of such a form, and arranged in such a manner, that they will bear so equally and uniformly in every part upon the back of a horse or mule, as to require no padding. The French hussar saddle tree has straight side bars, which do not fit the back of a horse with accuracy, and in consequence, it is necessary that they should be padded to prevent injury to the horse. The pommel and cantle of the French hussar saddle tree are combined and secured to the side bars by means of metallic fastenings.

I secure the pommel and cantle to the side bars of my military saddle tree by means of a rawhide covering, confined in the manner represented in the drawings; by which means my tree is much lighter and stronger than the French hussar tree. The side bars A, A, should be 19 to 20 inches in length, and the timber when rough, ought to be $3\frac{1}{2}$ inches thick. The two ends on their upper side, are brought to a plane surface where the pommel and cantle are joined to the same; the space between the pommel and cantle is shaved out to form a seat for the rider. The under sides of the side bars are worked off and so formed that they will rest on the back of a horse below the "great leaders"; and a sufficiently winding and oval surface is given to them (as represented in the drawings,) to insure their bearing with an equal and uniform pressure from front to rear. The side bars are from 5 to 7 inches wide, and vary from one fourth of an inch to an inch in thickness.

The pommel C, is twelve inches in height, from two to three in width at its upper end, and from 10 to 11 inches at its lower extremities. The pommel is plano-convex in its form; the front side being flat, and its rear surface convex. The top of the pommel is rounded off, and is slightly curved forward; an aperture is formed near the top of the pommel, faced on each side with ornamental metallic plates; which aperture is for the reception of a strap, with which to secure an overcoat or other luggage.

The height of the cantle (B,) is 14 inches; its width from two to three inches at its upper extremity, and from 11 to 12 inches at its lower extremities. The front or inner surface of the cantle, is worked out to a concave form, for the purpose of giving a safe and easy seat to the rider; (in this particular it varies from the cantle of the French hussar saddle tree, both the front and rear surfaces of which are of a convex form;) the rear side of the pommel (C,) is of an oval or convex form. One and half inches is the usual thickness given to the cantle at its center. The narrow upper portion of the cantle curves gracefully to the rear, as represented in the drawings, and has an aperture near its extremity, faced on each side with ornamental metallic plates, for the reception of straps for suspending and securing the valise under the same. The forks in the pommel and cantle terminate in semicircular concavities, which are so far elevated as to be, in all cases of reduced flesh, above the withers and back of a horse. These four pieces—the pommel, side bars, and cantle—being formed as above described, are connected to each other by screws, nails, or pegs. Along the front and rear sides of the base of the pommel and cantle, a series of small apertures are formed in the side bars, as represented in Fig. 5; which apertures open into grooves *f, f,* formed in the under side of the side bars, as represented in Fig. 2.

The tree thus prepared, is covered with soft, wet raw hide of suitable strength in the following manner. The hide is stretched over the upper side of the side bars in one piece, covering both sides of the pommel and cantle, and is secured by thongs passing through the hide, and through the holes in the side bars; thus forming a seam on each side of the joints at the junction of the pommel and cantle, with the side bars; the grooves f, f, on the under side of the side bars, receive the thongs and prevent their making a prominence on the bearing surfaces of the same. The upper covering is then trimmed even with the edges of the tree, and the under covering of raw hide is fitted and sewed to the upper covering by thongs. In drying, the raw-hide covering shrinks upon the tree, binding and supporting equally every portion of the same; giving to the tree more than double the strength for its weight, that can be given to a tree in which the pommel, side bars, and cantle, are confined to each other by metallic fastenings. It will therefore be clearly perceived, that my military saddle tree is not only perfect in form, but is also much lighter and stronger than any military saddle tree ever before constructed.

Winding side bars have been used in the Spanish and Mexican saddle trees; the side bars of my improved military saddle tree have the following described improvement on the side bars made use of in those trees: viz,—a cut of some two inches in depth is made in the lower edge of each of the side bars, forming shoulders (g,) nearly in a line with the front side of each leg of the pommel; from the base of these shoulders, the lower edge of each side bar is curved off to the rear, as represented in the drawings. The object of forming this recess in the lower edge of the side bars, is to narrow the saddle in front, for the purpose of giving a firm and steady seat to the rider by giving free play to the muscles of the thigh. When a rider's thighs are so far spread by a saddle as to prevent this free play of the muscles, it necessarily gives him an unsteady and unsafe seat in the saddle. The stirrup bars d, d, are secured as represented in the drawings; their front ends are riveted to the shoulders g, g, and their rear ends to the lower edge of the narrowest part of the side bars.

As my military saddle resembles somewhat in its external appearance the French hussar saddle, I will here more particularly point out the difference between the trees on which they are constructed. The pommel of my military saddle tree curves slightly forward,—its front surface is flat, and its rear surface is convex; an aperture—faced with metallic plates,—is formed near its upper end for the reception of a strap or straps by which to suspend baggage. The pommel of the French hussar saddle tree is straight, and there is no aperture through the same for the reception of luggage straps: its form in other respects is like the pommel of my military saddle tree. The cantle of my military saddle tree has a concave inner surface and a convex outer surface, and has an aperture through the same near its upper end, faced with metallic plates for the reception of valise straps. The cantle of the French hussar saddle tree is convex on both sides and has no aperture faced with metallic plates through the same for the reception of valise straps; in all other particulars its shape is the same as that of the cantle of my military saddle tree. The side bars of my military saddle tree bear no resemblance to those of the French hussar saddle tree, as has already been particularly set forth. The pommel and cantle of the French hussar saddle tree are secured to the side bars by means of iron straps, angle plates, bolts, rivets, or screws. The pommel and cantle of my military saddle tree, are secured to the side bars by means of a strong raw hide covering in the manner herein set forth.

I am aware that saddle trees have been made in which the under side of the tree has been made to fit the form of the back of a horse, while the upper side of the tree was not shaped with reference to the comfort of the rider. But in my tree, the upper and under sides are quite different in form,—the under side fitting the horse's back, and the upper side shaped to suit the rider.

What I claim therefore as my invention and desire to secure by Letters Patent, is—

The form of my improved side bars,—the under side of which are adapted to the form of a horse, and the upper side and edges to the seat of the rider, as herein described and represented;—and the combining and securing the same to a high pommel and cantle by means of a raw hide covering substantially as herein set forth.

THORNTON GRIMSLEY.

Witnesses:
Z. C. ROBBINS,
CHAS. G. PAGE.